US009179291B1

(12) United States Patent
Stegall

(10) Patent No.: US 9,179,291 B1
(45) Date of Patent: Nov. 3, 2015

(54) PROVIDING A SET OF SERVICES TO A MULTI-MODE MOBILE STATION THAT IS ABLE TO OPERATE OVER PACKET-SWITCHED AND CIRCUIT-SWITCHED ACCESS NETWORKS

(75) Inventor: Mark A. Stegall, Melissa, TX (US)

(73) Assignee: Apple Inc., Cupertino, CA (US)

( * ) Notice: Subject to any disclaimer, the term of this patent is extended or adjusted under 35 U.S.C. 154(b) by 2552 days.

(21) Appl. No.: 11/584,699

(22) Filed: Oct. 20, 2006

Related U.S. Application Data

(60) Provisional application No. 60/728,540, filed on Oct. 20, 2005.

(51) Int. Cl.
H04W 8/18 (2009.01)
(52) U.S. Cl.
CPC .................................. H04W 8/18 (2013.01)
(58) Field of Classification Search
CPC ....... H04W 88/06; H04W 8/18; H04W 64/00; H04W 28/12; H04W 8/06; H04L 29/06027; H04L 43/0805; H04L 67/24
USPC ............... 370/352–356, 328, 338; 455/552.1, 455/435.1, 435.2, 466.433
See application file for complete search history.

(56) References Cited

U.S. PATENT DOCUMENTS

| 6,560,457 | B1 * | 5/2003 | Silver et al. | 455/445 |
| 6,567,667 | B1 * | 5/2003 | Gupta et al. | 455/445 |
| 6,628,645 | B2 * | 9/2003 | Scheurich | 370/353 |
| 7,508,928 | B1 * | 3/2009 | Everson et al. | 379/221.01 |
| 8,401,002 | B2 * | 3/2013 | Allen et al. | 370/352 |
| 8,743,709 | B1 * | 6/2014 | Stegall | 370/252 |
| 2002/0034166 | A1 * | 3/2002 | Barany et al. | 370/329 |
| 2002/0110104 | A1 * | 8/2002 | Surdila et al. | 370/338 |
| 2004/0266426 | A1 * | 12/2004 | Marsh et al. | 455/426.2 |
| 2006/0046714 | A1 * | 3/2006 | Kalavade | 455/428 |
| 2006/0114882 | A1 * | 6/2006 | Mills | 370/352 |
| 2006/0121916 | A1 * | 6/2006 | Aborn et al. | 455/456.5 |
| 2006/0256751 | A1 * | 11/2006 | Jagadeesan et al. | 370/331 |

(Continued)

OTHER PUBLICATIONS $3^{rd}$ Generation Partnership Project (3GPP), Technical Report (TR) 23.979 v6.2.0, published Jun. 2006, pp. 36-37.*

(Continued)

Primary Examiner — Brandon Miller
(74) Attorney, Agent, or Firm — Meyertons, Hood, Kivlin, Kowert & Goetzel, P.C.

(57) ABSTRACT

A set of services is from a multimedia network to a multi-mode mobile station that is able to operate over a packet-switched access network and a circuit-switched access network. Packet-switched call control messages are communicated between a node in the multimedia network and the multi-mode mobile station through the packet-switched access network when the multi-mode mobile station is attached to the packet-switched access network, where the packet-switched call control messages communicated through the packet-switched access network are used to provide the set of services. Packet-switched call control messages are communicated between the node in the multimedia network and the multi-mode mobile station through the circuit-switched access network when the multi-mode mobile station is attached to the circuit-switched access network, where the packet-switched call control messages communicated through the circuit-switched access network are used to provide the set of services.

24 Claims, 5 Drawing Sheets

(56) References Cited

U.S. PATENT DOCUMENTS

| | | | |
|---|---|---|---|
| 2006/0276192 A1* | 12/2006 | Dutta et al. | 455/436 |
| 2007/0002855 A1* | 1/2007 | Pessi | 370/389 |
| 2007/0014281 A1* | 1/2007 | Kant | 370/352 |
| 2007/0032194 A1* | 2/2007 | Griffin | 455/41.2 |
| 2007/0077964 A1* | 4/2007 | Llanos et al. | 455/557 |

OTHER PUBLICATIONS

3rd Generation Partnership Project (3GPP), Technical Specification (TS) 24.229 v6.7.0, published Jun. 2006, pp. 102-103.*

3GPP TS 33.210 v7.0.0 (Dec. 2005), $3^{rd}$ Generation Partnership Project; Technical Specification Group Services and System Aspects; 3G Security; Network Domain Security; IP Network Layer Security (Release 7); pp. 1-21 (2005).

3GPP TS 23.002 v7.1.0 (Mar. 2006), $3^{rd}$ Generation Partnership Project; Technical Specification Group Services and Systems Aspects; Network Architecture (Release 7); pp. 1-61 (2006).

3GPP TS 23.228 v7.4.0 (Jun. 2006), $3^{rd}$ Generation Partnership Project; Technical Specification Group Services and System Aspects; IP Multimedia Subsystem (IMS); Stage 2 (Release 7); pp. 1-197 (2006).

3GPP2 X.P0042-001-0 v0.84, $3^{rd}$ Generation Partnership Project 2 "3GPP2," Voice Call Continuity between IMS and Circuit Switched Sytems—Stage 2; pp. 1-52 (Aug. 2006).

Network Working Group, Request for Comments 3261, "SIP: Session Initiation Protocol," pp. 1-269 (Jun. 2002).

Network Working Group, Request for Comments 3265, "Session Initiation Protocol (SIP)—Specific Event Notification," pp. 1-38 (Jun. 2002).

* cited by examiner

US 9,179,291 B1

PROVIDING A SET OF SERVICES TO A MULTI-MODE MOBILE STATION THAT IS ABLE TO OPERATE OVER PACKET-SWITCHED AND CIRCUIT-SWITCHED ACCESS NETWORKS

CROSS-REFERENCE TO RELATED APPLICATION

This claims the benefit under 35 U.S.C. §119(e) of U.S. Ser. No. 60/728,540, entitled "Packet Signaling Service," filed Oct. 20, 2005, which is hereby incorporated by reference.

TECHNICAL FIELD

The invention relates generally to providing a set of services to a multi-mode mobile station that is able to operate over packet-switched and circuit-switched access networks.

BACKGROUND

Mobile or wireless communications networks are capable of carrying circuit-switched and packet-switched traffic (e.g., voice traffic, data traffic, etc.) between mobile stations and other endpoints, which can be another mobile station or an endpoint connected to a network such as a public-switched telephone network (PSTN) or a packet data network. Traditional wireless protocols provide for circuit-switched communications, such as the circuit-switched protocol provided by 1xRTT, defined by CDMA 2000. With circuit-switched communications, a dedicated circuit or channel is established between nodes and terminals to allow communication between endpoints. Each circuit that is dedicated cannot be used by other users until the circuit or channel is released.

In contrast, with packet-switched communications, data is split into packets, with the packets routed individually over one or more paths. A widely-used form of packet-switched communications is defined by the Internet Protocol (IP). Examples of packet-switched communications that are possible over data networks include electronic mail, web browsing, file downloads, electronic commerce transactions, voice or other forms of real-time, interactive communications, and others. To enable the establishment of packet-switched communications sessions in a network, various control functions (implemented with software and/or hardware) are deployed in the network. Some standards bodies have defined subsystems within communications networks that include such control functions. One such standards body is the Third Generation Partnership Project (3GPP), which has defined an Internet Protocol (IP) multimedia subsystem (IMS) that includes various control functions for provision of IP multimedia services, including audio, video, text, chat, or any combination of the foregoing.

In the 3GPP2 context, the equivalent of the IP multimedia subsystem is sometimes referred to as a multimedia domain (MMD) network. The term "multimedia network" is used to generally refer to any one of an IP multimedia subsystem, MMD network, or any other network in which multimedia communications (any one or more of video, audio, text, chat, e-mail, web browsing, etc.) are possible.

To provide wireless access to a multimedia network, a wireless access network according to any of the following standards can be used: 1xEV-DO or 1xEV-DV (which are defined by the CDMA 2000 family of standards), WiFi (which is a wireless local area network or WLAN technology defined by the IEEE 802.11 specifications), and WiMAX (Worldwide Interoperability for Microwave Access) (which is also a WLAN technology defined by the IEEE 802.16 specifications). Note that 1xRTT also provides packet-switched communications, in addition to circuit-switched communications.

It is common for circuit-switched access networks (such as those based on 1xRTT) to coexist with packet-switched access networks for multimedia networks. Certain mobile stations are able to operate with both circuit-switched wireless access networks and packet-switched wireless networks. Such mobile stations are referred to as multi-mode mobile stations or multi-mode handsets.

Conventionally, when a multi-mode mobile station transitions between a packet-switched wireless access network and a circuit-switched wireless access network, the set of services provided to the multi-mode mobile station changes. When attached to the packet-switched access network, nodes (e.g., application servers or other nodes) in the multimedia network (part of a packet-switched service domain) provides services to the mobile station. However, when the mobile station transitions to the circuit-switched access network, services to the mobile station are provided by nodes in the circuit-switched service domain.

As a result, when a multi-mode mobile station transitions between a circuit-switched access network and a packet-switched access network, the services provided to the multi-mode mobile station will be interrupted since the provider of the services will have to switch to a different service domain.

SUMMARY

In general, to provide a set of services from a multimedia network to a multi-mode mobile station that is able to operate over a packet-switched access network and a circuit-switched access network, packet-switched call control messages are communicated between at least one node in the multimedia network and the multi-mode mobile station through the packet-switched access network or circuit-switched access network depending on whether the multi-mode mobile station is attached to the packet-switched access network or circuit-switched access network. The packet-switched call control messages are used to provide the set of services.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
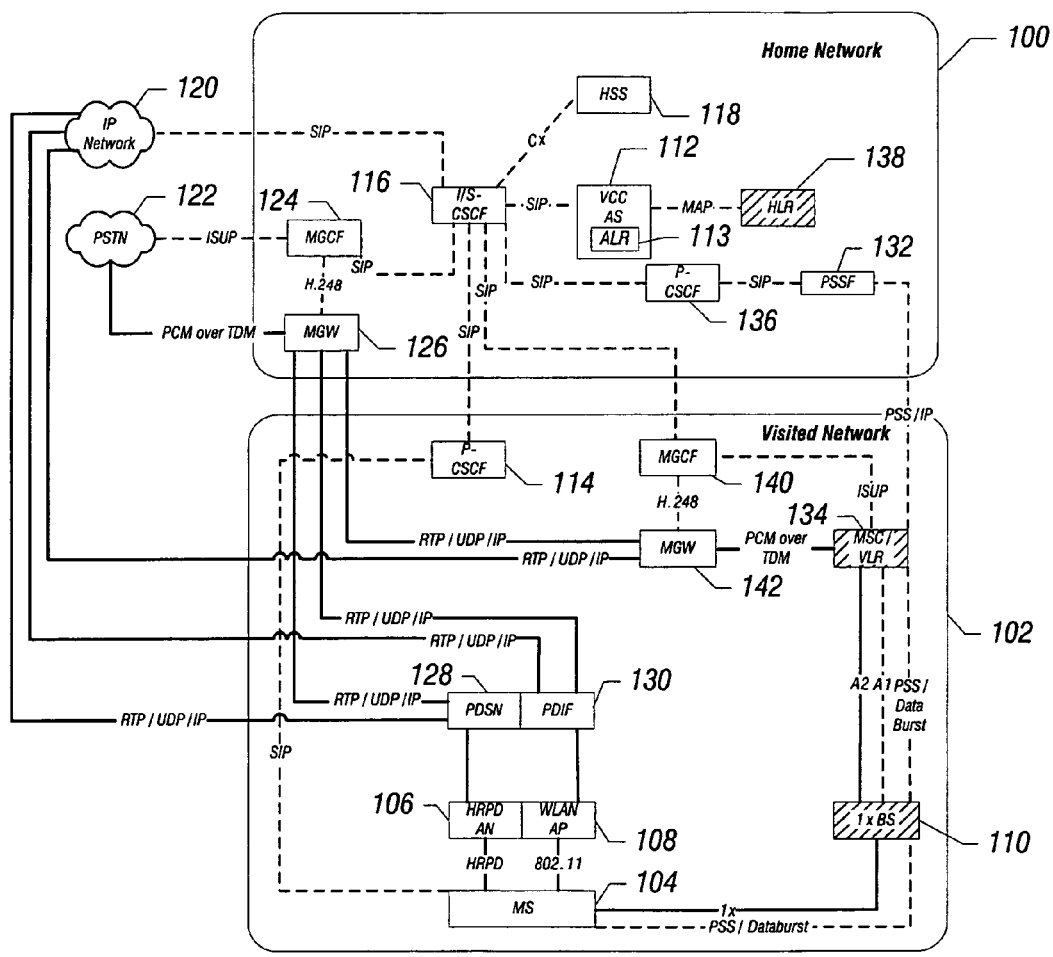
FIG. 1 is a block diagram of a communications network that includes a home network and a visited network, according to an embodiment.

FIG. 1 illustrates an example arrangement of a wireless communications network that includes a home network 100 and a visited network 102, from the perspective of a mobile station 104. The home network 100 is the home network of the mobile station 104 and the visited network 102 is a different network in which the mobile station 104 is currently located.

The mobile station 104 is a multi-mode mobile station that is able to operate over either a packet-switched access network or a circuit-switched access network. Examples of a packet-switched access network include one or more of the following: 1xEV-DO or 1xEV-DV access network 106 according to CDMA (code division multiple access) 2000, also referred to as HRPD (high rate packet data); and a wireless local area network (WLAN) access network 108, such as a WLAN access network defined by WiFi (IEEE 802.11a, 802.11b, or 802.11g) or by WiMAX (IEEE 802.16 or 802.16a). Other forms of packet-switched wireless access networks can also be employed in other implementations.

Examples of a circuit-switched access network include a 1xRTT (also defined by CDMA 2000) access network, as provided by a 1xRTT base station 110 in FIG. 1. The packet-switched wireless access network and circuit-switched wireless access network shown in FIG. 1 are both part of the visited network 102. Thus, the mobile station 104 is able to transition between the packet-switched access network and the circuit-switched access network (or alternatively, the mobile station 104 can be attached to both the packet-switched access network and circuit-switched access network) while the mobile station 104 is operating in the visited network.

In accordance with some embodiments, the set of services provided to the mobile station 104 is provided by a multimedia network in a packet-switched service domain regardless of whether the mobile station 104 is attached to the packet-switched access network or the circuit-switched access network. Attachment to an access network means that the mobile station is currently communicating with a remote node over the access network. Effectively, the services provided to the multi-mode mobile station are anchored at the multimedia network regardless of whether the mobile station is attached to the packet-switched access network or the circuit-switched access network. Consequently, end user service operation is not impacted by how the multi-mode mobile station is attached.

The term "multimedia network" refers to any network that has control functions providing packet-switched multimedia services. Control functions in a multimedia network are able to exchange packet-switched messaging (packet-switched call control messaging such as Session Initiation Protocol or SIP messaging) to establish or control a packet-switched multimedia call session. A "packet-switched call control message" refers to a call control message that is used to initiate, terminate, or control packet-switched call sessions, such as call sessions that provide multimedia services. A "multimedia call session" or "call session" refers to any session for communicating of any one or more of voice, other audio, video, text, chat, and others. A "control function" refers to hardware and/or software for performing call control tasks to enable establishment of multimedia call sessions. Examples of multimedia networks include the Internet Protocol (IP) multimedia subsystem (IMS) defined by 3GPP (Third Generation Partnership Project), the multimedia domain (MMD) provided by 3GPP2, or any other network in which multimedia communications can be performed.

In FIG. 1, the multimedia network includes nodes in both the visited network 102 and the home network 100. In FIG. 1, the multimedia network includes nodes 112, 114, 116, 118, 124, 126, 132, 136, 140, and 142 (discussed further below). The multimedia network can be considered to be part of a packet-switched service domain. The packet-switched service domain also includes the packet-switched access network (106, 108) and the packet data node (128, 130). On the other hand, a circuit-switched service domain includes the circuit-switched access network (base station 110) and nodes 134 and 138 (discussed further below). Although illustrated as being separate nodes, some of the nodes depicted in FIG. 1 can be combined into one physical node (e.g., a computing system).

The set of services provided to the mobile station 104 can be provided by an application server 112 as well as other nodes in the multimedia network, discussed further below. In one implementation, the application server 112 is a voice call continuity (VCC) application server. However, in other implementations, other types of application servers are used. Generally, an application server can provide various services, including call waiting, caller ID, call hold, push-to-talk, call transfer, lawful intercept, voicemail, conference call, location-based services, and so forth. Although just one VCC application server 112 is depicted, other application servers may also be present in the multimedia network. Note that various control functions (discussed below) in the multimedia network can also provide services.

When the mobile station 104 is attached to the packet-switched access network (106 or 108), the mobile station 104 is able to communicate signaling through various control functions of the multimedia network, which signaling can include SIP call control messages. SIP is an application-layer control (signaling) protocol for creating, modifying, and terminating multimedia sessions (any one or more of a voice session, other audio session, video session, text session, chat session, or any combination of the foregoing). SIP is used as the call control signaling protocol by the various control functions in the home network 100 and the visited network 102. SIP is described in Request for Comments (RFC) 3261, entitled "SIP: Session Initiation Protocol," dated June 2002.

In the example of FIG. 1, the mobile station 104 communicates SIP signaling with a proxy call session control function (P-CSCF) 114, which P-CSCF is the first call control contact point for a terminal, such as the mobile station 104, in a multimedia network. The P-CSCF 114 further communicates SIP signaling with an interrogating CSCF (I-CSCF) or serving CSCF (S-CSCF) 116 in the home network 100. An I-CSCF is the contact point within a service operator's network for connections destined to users in the service operator's network. Example tasks performed by the I-CSCF include handling initial registration by interrogating a home subscriber server (HSS) 118, routing of a call control message received from another network towards an S-CSCF, and other tasks. An S-CSCF handles session control within the multimedia network on behalf of terminals.

As depicted in FIG. 1, the I/S-CSCF 116 communicates SIP signaling with the application server 112. Thus, when a mobile station 104 desires to establish a call session, SIP signaling is exchanged with the P-CSCF 114, I/S-CSCF 116, and application server 112. The call to be established can be with an endpoint that is coupled to an Internet Protocol (IP) network 120, a public switched telephone network (PSTN) 122, or another mobile station in the home network 100 or the visited network 102 (or in some other wireless network). To establish a call session with an endpoint coupled to the IP network 120, SIP signaling is exchanged by the I/S-CSCF 116 with the endpoint and/or other control functions on the IP network 120. To establish a call session with an endpoint coupled to the PSTN 122, SIP signaling is exchanged between the I/S-CSCF 116 and a media gateway control function (MGCF) 124, which performs call control protocol conversion between SIP and a circuit-switched call messaging protocol, such as an ISUP (ISDN User Part) protocol that is part of the Signaling System No. 7 (SS7) protocol used to set up telephone calls in a PSTN. The MGCF 124 also controls a media gateway (MGW) 126, such as by using H.248 control messages. The media gateway 126 converts between bearer traffic in packet-switched format and bearer traffic in circuit-switched format.

Once a call session is established using the control functions and application server discussed above, then bearer traffic of the established call session is communicated by the mobile station through the packet-switched access network (106 or 108) to a respective packet data serving node (PDSN) 128 or a packet-data interworking function (PDIF) 130. The PDSN 128 is used with the 1xEV-DO or 1xEV-DV access network, whereas the PDIF 130 is used with the WLAN access network 108. Generally, the PDSN 128 or PDIF 130 is a "packet data node" that is used as an interface between the wireless access network and the IP network 120. The PDSN 128 or PDIF 130 is able to communicate bearer traffic using UDP/IP (User Datagram Protocol/Internet Protocol) packets in some implementations. For voice data or other forms of real-time data, the bearer traffic can be in Real-Time Protocol (RTP) format.

The above describes the paths through the packet-switched access network to allow provision of a set of services from the multimedia network. If the mobile station 104 is attached to the circuit-switched access network (base station 110) instead of the packet-switched access network (106 or 108), then a different path is provided to enable the multimedia network to provide the same set of services to the mobile station 104. In this path, in accordance with some embodiments, packet signaling service (PSS)-encoded messages are exchanged between the mobile station 104 and a PSS function (PSSF) 132 in the home network 100 through the base station 110 and a mobile switching center (MSC) 134 in the visited network 102. The PSS-encoded messages are used to carry packet-switched call control messages (e.g., SIP signaling messages) through a circuit-switched access network.

Note that in some embodiments, the PSSF 132 can be located in the application server 112. In other implementations, the PSSF 132 can be located on another node. The PSSF 132 is a proxy user agent in the multimedia network 202. The PSS-encoded messages are carried in data bursts over the access, traffic and/or control channels of the 1xRTT access network. The data bursts are carried through the base station 110 to the MSC 134. The MSC 134 then extracts the PSS-encoded messages and inserts the PSS-encoded messages into corresponding IP packets that are sent to the PSSF 132.

The PSSF 132 decodes the PSS-encoded messages to extract the packet-switched call control messages, which are then sent to a P-CSCF 136 in the home network 100. The P-CSCF 136 in turn exchanges further packet-switched call control messaging with the I/S-CSCF 116, which in turn exchanges packet-switched call control messaging with the application server 112 or with another application server.

In the ensuing discussion, reference is made to SIP messaging; however, in other embodiments, other types of packet-switched call control messages can be used instead.

A reverse path is followed for SIP messages to be communicated to the mobile station, with the PSSF 132 encoding SIP messages destined to the mobile station 104 in PSS-encoded messages that are communicated in IP packets to the MSC 134. The MSC 134 in turn communicates data bursts containing the PSS-encoded messages through the base station 110 to the mobile station 104.

In the manner depicted in FIG. 1, according to some embodiments, services are provided by the multimedia network to the mobile station 104 regardless of whether the mobile station 104 is attached to a packet-switched access network or a circuit-switched access network. This allows for the provision of seamless services across circuit-switched and packet-switched access domains. Moreover, providing seamless services across packet-switched and circuit-switched access domains avoids the need to perform inter-domain handoff of service states, which is typically not supported by standards, such as 3GPP2 standards. In addition to providing a seamless service set and operation, mechanisms according to some embodiments also provide predictable and reliable service delivery. Moreover, a further benefit is that a single-mode mobile station attached just to the circuit-switched access network can be provided with multimedia services that are conventionally not available to the single-mode mobile station.

The communication of PSS-encoded messages according to some embodiments of the invention also allows for bi-directional inter-domain handoffs between a circuit-switched access network (such as 1xRTT access network) and a packet-switched access network (e.g., 1xEV-DO access network).

In accordance with some embodiments, the multi-mode mobile station 104 performs dual registration in both the packet-switched and circuit-switched domains; in other words, the mobile station 104 performs registration with both the home location register (HLR) 138 (in the home network 100) and the home subscriber server (HSS) 118 (also in the home network 100). The HLR 138 is the central database used for the circuit-switched service domain that contains details of each mobile station subscriber that is authorized to use the circuit-switched service domain. The combination of the S-CSCF 116 and the HSS 118 form is the equivalent of the HLR used in the packet-switched service domain.

Dual registration at both the HLR and HSS helps to reduce or eliminate issues associated with "ping-pong" registrations between service domains (such as when the mobile station transfers between different domains a number of times). Also, the dual registrations allow the mobile station to utilize multiple access domains simultaneously (to perform simultaneous communications over both the circuit-switched access network and the packet-switched access network). One example application of this is voice communication over the circuit-switched access network concurrent with video streaming over the packet-switched access network.

Because of the dual registration performed by the multi-mode mobile station, there is a possibility of stale registration if the multi-mode mobile station loses connection with one of the packet-switched access network and circuit-switched access network. For example, if the packet-switched service domain is not aware that the mobile station 104 is no longer reachable over the packet-switched access network (106 or 108), then the packet-switched service domain may still attempt to page the mobile station 104 through the packet-switched access network, which is wasteful of system resources. In accordance with some embodiments, information regarding the availability of the mobile station over a particular access network is passed to an availability location register (ALR) 113 in the application server 112. By keeping the availability of the mobile station over a particular access network up-to-date in the ALR 113, failed call delivery and/or unnecessary use of paging channel resources can be avoided or reduced.

The ALR 113 can be used by the multimedia network 202 to determine the optimal technique of service delivery to a multi-mode mobile station. The ALR 113 can maintain information received from the multi-mode mobile station regarding the quality of radio frequency (RF) coverage in the different access networks, such that the multimedia network 202 can determine the optimal way to provide service to the mobile station. The multimedia network 202 can also deliver service to the mobile station 104 according to the geographic location of the mobile station, the time of day, or other criteria. The ALR 113 allows a network to make intelligent service delivery decisions regarding the optimal network to deliver services. This can be done without impacting registration state of the mobile station and without driving additional registration traffic. Note that the ALR 113 is not present in a conventional communications system, as the conventional communications system typically employs just one path for service delivery to a mobile station.

The MSC 134 in the visited network 102 also includes a visitor location register (VLR), which is a database that stores information about mobile stations that are currently being served by the MSC 134. For communicating with nodes in the multimedia network, the MSC 134 is able to communicate through an MGCF 140 and a media gateway 142, which are similar to the MGCF 124 and media gateway 126 discussed above. Thus, when the mobile station 104 is attached to the circuit-switched access network, it is able to communicate signaling and data through the MGCF 140 and media gateway 142, respectively, with the multimedia network.

Note that various links between the various nodes depicted in FIG. 1 are not shown, to enhance clarity. Also, note that the arrangement depicted in FIG. 1 is merely provided for purposes of example, as other implementations can use other arrangements.

Figure 2:
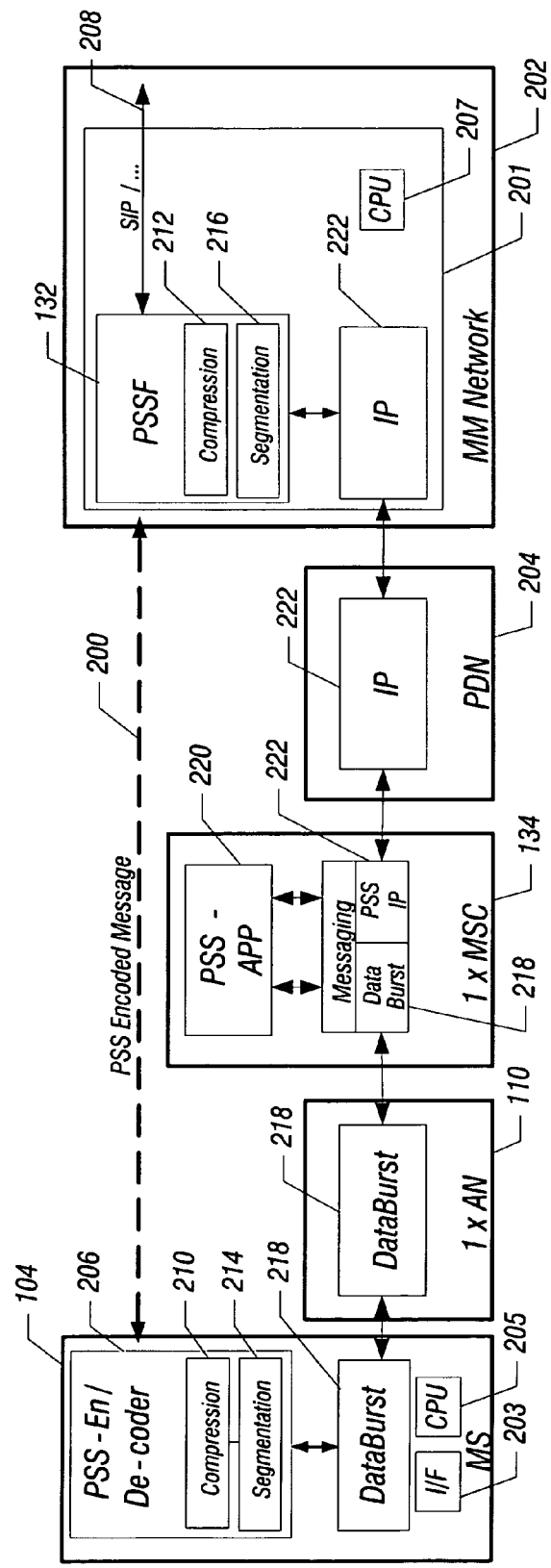
FIG. 2 is a block diagram of components of various nodes of the wireless communications network to enable communication between a multi-mode mobile station and nodes in a multimedia network, in accordance with an embodiment.

FIG. 2 shows components involved in the communication of a PSS-encoded message 200 between the mobile station 104 and the PSSF 132 in a multimedia network 202. The PSS-encoded message 200 is communicated through the circuit-switched (1xRTT) access network 110 and MSC 134. Moreover, communication between the MSC 134 and the multimedia network 202 is through a packet data network 204, which can be an IP network (e.g., the dashed link between the MSC 134 and the PSSF 132 in FIG. 1).

As further shown in FIG. 2, the mobile station 104 includes a PSS encoder/decoder 206 (implemented with software, for example, that is executable on a central processing unit or CPU 205 of the mobile station 104) that performs PSS encoding or decoding. Outbound call control signaling messages, such as SIP messages, are encoded by the PSS encoder 206 and sent through the circuit-switched access network 110, MSC 134, and packet data network 204 to the multimedia network 202. The mobile station 104 includes interfaces 203 (e.g., radio frequency interfaces) to communicate wirelessly over both a circuit-switched access network and packet-switched access network.

The PSSF 132 extracts the call control message, such as a SIP message, and forwards the SIP message (at 208) to another node in the multimedia network 202. As depicted in FIG. 2, the PSSF 132 can be part of a node 201, with the PSSF 132 implemented with software that is executable on a CPU 207 of the node 201. The node 201 can also include other functions, such as the VCC application server 112 and/or CSCFs.

In the reverse direction, the PSSF 132 performs encoding of a call control message, such as a SIP message, that is sent in the reverse direction to the mobile station 104, with the PSS-encoded message decoded by the PSS decoder 206.

Encoding a call control message involves compressing the call control message, and possibly segmenting the call control message. Note that SIP messages are text messages that are relatively large in size. To reduce the amount of information that has to be sent over the wireless interface (provided by the circuit-switched access network 110), the SIP messages are compressed by PSS encoder 206 in the mobile station 104 and the PSSF 132 in the multimedia network 202. Compression is performed by respective compression modules 210 and 212 in the PSS encoder/decoder 206 and PSSF 132. If after compression, the message is still too large, then segmentation can be performed to break the message into multiple data bursts, with the segmentation performed by segmentation modules 214 and 216 in the PSS encoder/decoder 206 and PSSF 132, respectively.

Each of the PSS encoder 206 and PSSF 132 also adds some header information to the compressed (and possibly segmented) call control message to indicate PSS encoding has been applied. The PSS-encoded message is communicated in a data burst 218 that travels between the MSC 134 and mobile station 104 through the access network 110. As noted above the data burst 218 can be any one of an access channel, traffic channel, and control channel in the access network 110.

In the MSC 134, a PSS application 220 is provided to convert between the data burst 218 and an IP packet 222 containing the PSS-encoded message. In performing the conversion, the PSS application 220 extracts the PSS-encoded message from the data burst 218, and encapsulates the PSS-encoded message in an IP packet 222. In the reverse direction, the PSS application 220 decapsulates the PSS-encoded message from an IP packet 222, and inserts the PSS-encoded message into a data burst 218. The IP packet 222 containing the PSS-encoded message is communicated between the MSC 134 and the multimedia network 202 through the packet data network 204.

The call control message carried in the PSS-encoded message can be used to perform various call services, including the following: registration; call origination from the mobile station; call termination at the mobile station; mid-call services (e.g., call hold, call waiting); domain transfer between the circuit-switched and packet-switched access networks; updating the ALR 113 (FIG. 1); and/or other services.

Various example flow diagrams are provided below to discuss the various call services that can be accomplished using PSS, in accordance with some embodiments. The example call flows illustrate the various functions (e.g., PSSF 132, application server 112, ALR 113, I/S-CSCF 116, MGCF 140) in the multimedia network 202 that are involved in providing services to the mobile station, regardless of whether the mobile station is attached to the circuit-switched or packet-switched access network. As noted above, it is assumed that the multi-mode mobile station 104 has dual registration (in both the packet-switched and circuit-switched domains simultaneous registration with both the HLR 138 and HSS 118 in FIG. 1).

Also, it is noted that the multi-mode mobile station has two multimedia network private identifiers, with a first private identifier representing the mobile station when the mobile station is accessing the multimedia network over the native multimedia network access network (such as the access network 106 or 108 in FIG. 1). The second private identifier represents the mobile station when the mobile station is accessing the multimedia network 202 over the circuit-switched access network, such as the 1xRTT access network 110 in FIG. 1. The two private identifiers allow the multimedia network to distinguish between the scenario where the mobile station 104 is attached to the circuit-switched access network from the scenario where the mobile station is attached to the packet-switched access network. From the perspective of the multimedia network, the mobile station attached through the circuit-switched access network is viewed as standard multimedia network client connected to the multimedia network 202.

Figure 3:
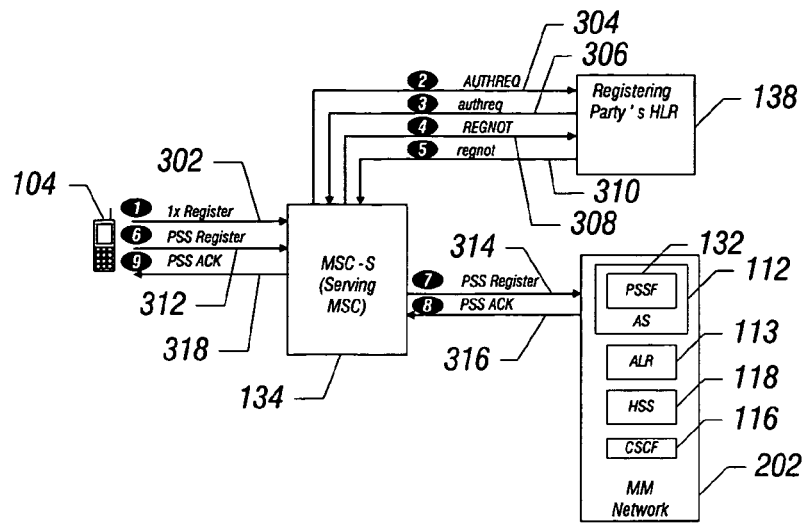
FIGS. 3-11 illustrate various message flows to perform various different services, in accordance with some embodiments.

FIG. 3 shows a procedure performed by the mobile station 104 upon power up. In the ensuing discussion, it is assumed that the circuit-switched access network is a 1xRTT access network, and that the PSSF 132 is part of the VCC application server 112. Upon power up, the mobile station 104 performs registration in the 1xRTT network. The mobile station 104 performs 1xRTT registration by sending (at 302) a 1xRTT registration message to the MSC 134 (which is assumed to be the serving MSC in this flow). In response to the 1xRTT registration message, the MSC 134 sends (at 304) an AUTHREQ (authorization request) message to the HLR 138 of the registering party (in this case mobile station 104). The AUTHREQ message is an HLR authentication request defined by ANSI-41 to validate a mobile station. The HLR 138 responds (at 306) with an authreq message to the MSC 134 to indicate that the mobile station 104 has been validated.

Next, the MSC sends (at 308) a REGNOT (registration notification) message to the HLR 138, which is also an ANSI-41 message that provides registration notification from the MSC 134 to the HLR 138. The registration notification sent at 308 indicates that the MSC 134 is the serving MSC for the mobile station 104. The HLR 138 responds (at 310) with a regnot message (acknowledge of REGNOT) to the MSC 134.

The foregoing defines the registration performed in the 1xRTT network. To also register in the multimedia network 202, the mobile station 104 sends (at 312) a PSS Register message to the MSC 134, where the PSS Register message represents a SIP Register message that has been PSS encoded. The PSS Register message sent from the mobile station 104 to the MSC 134 is carried in a data burst (218 in FIG. 2) over the 1xRTT access network. The MSC 134, upon receiving the data burst containing the PSS Register message, extracts the PSS Register message from the data burst and encapsulates the PSS Register message in an IP packet for transmission (at 314) to the multimedia network 202.

When under 1xRTT network coverage, the mobile station 104 is provided with the identifier (System ID) of the MSC 134 that is serving the mobile station 104 through broadcast messages. The System ID of the serving MSC is referred to herein as "MSC ID." This identifier is noted by the mobile station 104. When performing the PSS registration, the MSC ID is provided to the PSSF 132. Although not shown in FIG. 3, following 1xRTT registration, the mobile station 104 in some implementations can send a request for assignment of a PSSF (assuming that there are multiple PSSFs in the multimedia network 202). For example, different PSSFs may be employed depending on the MSC ID (for load balancing purposes). Assignment of the PSSF can be initiated using a PSSF assignment request that is sent to a provisioned (well-known) PSSF address, which PSSF assignment request is sent by the MSC 134 to the provisioned PSSF. The provisioned PSSF queries the HSS 118 to identify the appropriate PSSF to be used by the mobile station 104 depending on the MSC ID. The corresponding PSSF address is then provided back to the mobile station 104. The PSS Register message sent at 312 is sent to the identified PSSF.

In response to the PSS Register message 314 received from the MSC 134, the PSSF 132 in the multimedia network 202 performs PSSF registration, in which the PSSF 132 stores the identifier (e.g., mobile identification number or mobile directory number) of the mobile station and the MSC ID of the MSC serving the mobile station. Next, the PSSF 132 triggers a SIP registration in the multimedia network 202, with the appropriate registration performed with the HSS 118. Registration in the multimedia network 202 includes the PSSF 132 sending a SIP Register message to the S-CSCF 116, and the I/S-CSCF 116 in turn sending a server assignment request (SAR) to the HSS 116.

Once registered, the mobile station 104 is recognized as an active user agent in the multimedia network 202. Following registration, the ALR 113 is also updated to indicate the current availability of the mobile station 104 (which can include availability over both the circuit-switched and packet-switched access networks). The multimedia network registration enables the mobile station 104 to receive or initiate multimedia network services as a registered multimedia network user.

Successful completion of the SIP registration is acknowledged using a SIP 200 OK message, which is communicated (at 316) back to the MSC 134 as a PSS OK message (where the SIP OK message is PSS-encoded). The PSS OK message is carried in an IP packet from the PSSF 132 to the MSC 134. From the MSC 134, the PSS OK message is sent (at 318) in a data burst over the circuit-switched access network to the mobile station 104.

When the mobile station 104 is attached to a packet-switched access network, standard multimedia network registration is performed.

Figure 4:
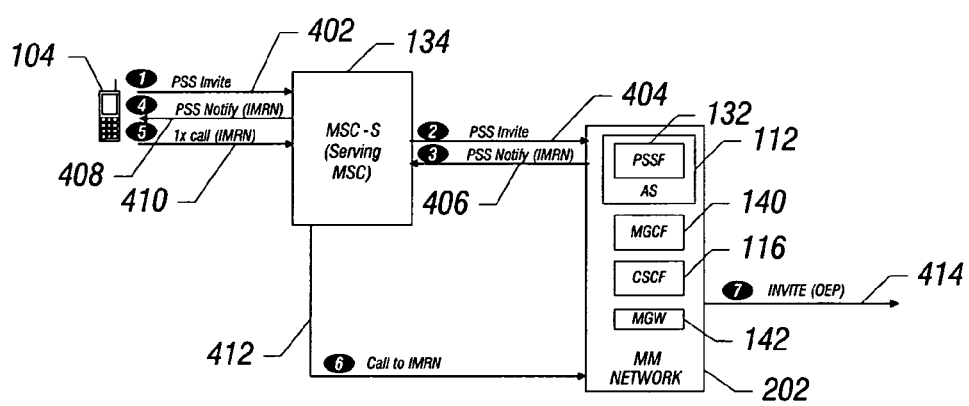

FIG. 4 shows a flow diagram to perform call origination using the 1xRTT access network. In accordance with some embodiments, rather than perform the 1xRTT call establishment using services provided by the circuit-switched service domain, the call origination using the 1xRTT access network performs the call establishment using services provided by the packet-switched service domain (more particularly one or more nodes in the multimedia network 202). The mobile station 104 sends a PSS Invite message (at 402) to the MSC 134. The Invite message is a SIP Invite message used to establish a call session. The PSS Invite message is forwarded (at 404) by the MSC 134 to the multimedia network 202. The PSS Invite message 404 is received by the PSSF 132, which returns an IP multimedia routing number (IMRN) in a PSS Notify message that is sent (at 406) to the MSC 134. The IMRN is to be used by the mobile station 104 to establish the circuit-switched call leg (for the bearer path) through the 1xRTT access network, MSC 134, and the media gateway 142 in the multimedia network 202. As noted above, the media gateway 142 converts between circuit-switched bearer traffic on the circuit-switched call leg and the packet-switched bearer traffic in the multimedia network 202.

The PSS Notify message (406) includes a SIP Notify message that is used to provide notification of occurrence of an event that has been subscribed to by the mobile station (using a SIP Subscribe message). The SIP Subscribe and Notify methods are described in RFC 3265, entitled "Session Initiation Protocol (SIP)-Specific Event Notification," dated June 2002. In other implementations, a different message can be sent by the PSSF 132 to provide the IMRN.

The MSC 134 forwards (at 408) the PSS Notify message to the mobile station 104. Next, the mobile station 104 sends (at 410) a 1xRTT origination request to the specified IMRN to request establishment of the circuit-switched call leg. In response to the 1xRTT origination request, the MSC 134 performs a call (at 412) to the multimedia network 202. The call (412) from the MSC 134 to the multimedia network 202 can be in the form of an ISUP Initial Address Message (IAM) that is directed towards the IMRN. This causes the IAM to be directed towards the MGCF 140 in the multimedia network 202, which generates a SIP Invite message pursuant to the IMRN, and sends the Invite message to the application server 112. The application server 112 then sends an Invite message to the other endpoint (OEP), which is forwarded (at 414) by the I/S-CSCF 116 as an Invite message to the other endpoint. The other endpoint (OEP) is the endpoint with which the mobile station 104 is attempting to establish the call session. Response SIP messages to the Invite message are provided by the other endpoint, which response messages are forwarded from the multimedia network 202 through the MSC 134 in the form of a ISUP ANM (answer) message to the MSC 134. The circuit-switched call leg is then completed to the mobile station 104 using 1xRTT call messages.

Figure 5:
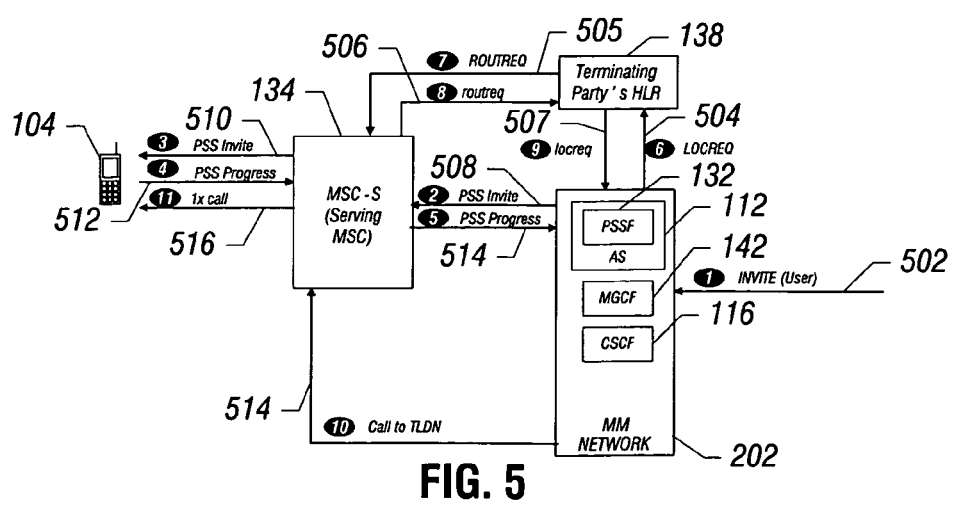

FIG. 5 shows a call termination at the mobile station 104 (a call originated by an origination endpoint that is targeted to the mobile station 104) that is attached to the 1xRTT access network. The origination endpoint sends (at 502) an Invite message to the multimedia network 202. The Invite message 502 is processed through the I/S-CSCF 116, which contacts the application server 112 (VCC application server) to determine the optimal method of call delivery. Note that the application server 112 contains the ALR 113, which contains information such as RF conditions of the mobile station 104. Assuming that the ALR 113 determines that the optimal service delivery is through the 1xRTT access network, the application server 112 sends (at 504) a LOCREQ (location request) message to the HLR 138 associated with the terminating party (in this case mobile station 104). The LOCREQ request is an ANSI-41 location request that is provided to request the HLR 138 to determine where the call is to be routed. In response, the HLR 138 sends (at 505) a ROUTREQ message to the MSC 134, which is an ANSI-41 routing request used to obtain the temporary location directory number (TLDN), which identifies the MSC 134 serving the mobile station 104 that is the destination of the call request. The MSC 134 responds (at 506) with a routreq message to the HLR 138, where the routreq message contains the TLDN of the MSC. The HLR 138 then returns (at 507) a locreq message that includes the TLDN, which identifies the MSC 134 serving the mobile station 104 that is the destination of the call request.

While the LOCREQ message 504 is being sent to the HLR 138, the PSSF 132 also sends a PSS Invite message (at 508) to the MSC 134, which forwards (at 510) the PSS Invite message to the mobile station 104.

The mobile station 104 responds with a PSS Progress message (at 512), a PSS-encoded message containing a SIP Progress message to indicate that the mobile station is processing the Invite request. The MSC 134 delivers the PSS Progress message (at 514) to the PSSF 132. In response to receipt of the Progress message, the PSSF sends an Invite message containing the TLDN to the MGCF 140, which then performs an IAM call (at 514) to the MSC 134. In response to the IAM message, the MSC 134 sends a 1xRTT call (at 516) to the mobile station 104. Further messages (not shown) are then exchanged to complete the 1xRTT call leg between the mobile station 104 and the MGCF/MGW through the MSC 134.

Figure 6:
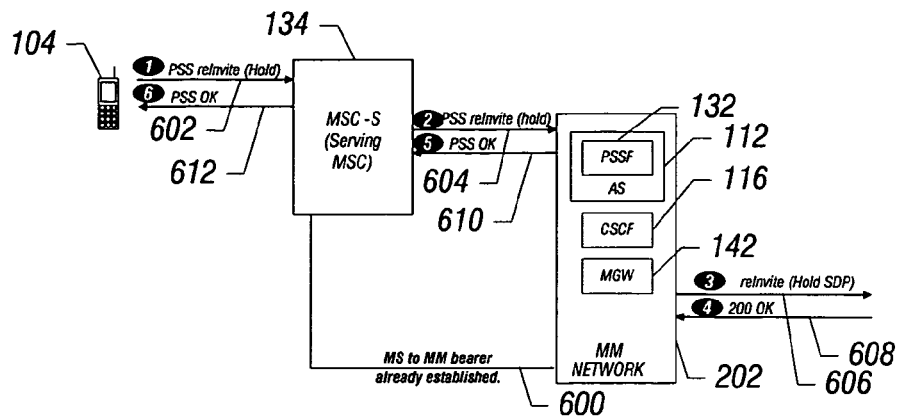

FIG. 6 shows provision of a mid-call service, such as call hold, using the PSS technique. It is assumed that a circuit-switched bearer path (600) has already been established between the mobile station 104 and the media gateway 142. To place a call on hold, the mobile station 104 sends (at 602) a PSS reInvite message (with a hold SDP indication) to the MSC 134, which forwards (at 604) the PSS reInvite with a hold SDP indication to the multimedia network 202. The reInvite message is a SIP message used to perform a mid-call service. The hold SDP (Session Description Protocol) indication is provided to cause the other endpoint to place the media path on hold. In response to the PSS reInvite message, the PSSF 132 sends a reInvite message (with a hold SDP indication) to the I/S-CSCF 116, which in turn sends (at 606) the reInvite message to the other endpoint involved in the call session.

The other endpoint responds (at 608) with a SIP 200 OK message, which is a SIP message acknowledging the reInvite message. The 200 OK message is forwarded by the I/S-CSCF 116 to the PSSF 132, which responds (at 610) with a PSS OK message to the MSC 134. The MSC 134 then forwards (at 612) the PSS OK message to the mobile station 104. At this point, the call has been successfully placed on hold.

Figure 7:
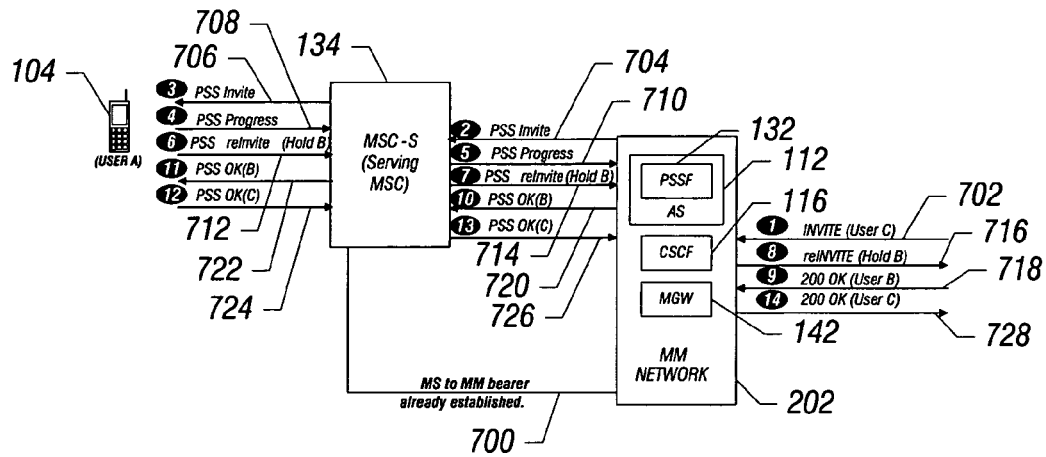

FIG. 7 shows provision of another example mid-call service, in this case, call waiting. It is assumed that a circuit-switched bearer path (700) has already been established between mobile station 104 (user A) and the media gateway 142 for the call between user A and another endpoint associated with user B. Assume further that a third endpoint (associated with user C) is attempting to call user A while user A is involved in a call session with user B. The endpoint associated with user C sends (at 702) a SIP Invite message to the multimedia network 202. The Invite message is received by the I/S-CSCF 116, which forwards the message to the PSSF 132. The PSSF 132 then sends (at 704) a PSS Invite message to the MSC 134, which in turns forwards (at 706) the PSS Invite message to the mobile station 104. The mobile station acknowledges with a PSS Progress message (at 708), which is forwarded (at 710) by the MSC 134 to the multimedia network 202. The Progress message is sent to indicate that the mobile station 104 is processing the Invite request from user C. Before the mobile station 104 can accept the call request from user C, the mobile station 104 has to place the call with user B on hold, using a flow similar to that described with respect to FIG. 6. The call hold is accomplished by the mobile station 104 sending a PSS reInvite message (with a hold B) indication to the MSC 134, which forwards (at 714) the PSS reInvite message to the multimedia network 202. The PSSF 132 processes the PSS reInvite message and forwards the reInvite message to the I/S-CSCF 116, which in turn sends (at 716) a reInvite (with a hold B) indication to the endpoint associated with user B. The endpoint associated with user B returns (at 718) a 200 OK message, which is forwarded from the CSCF 116 to the PSSF 132. The PSSF 132 then sends (at 720) the PSS OK message (from user B) to the MSC 134, which forwards (at 722) the PSS OK message to the mobile station 104.

Once the mobile station 104 receives the PSS OK message from user B, the call session between user A and B has been successfully placed on hold, and the mobile station 104 is able to acknowledge the Invite message (706) from user C by sending (at 724) a PSS OK (C) message to acknowledge the Invite from user C. The MSC 134 forwards (at 726) the PSS OK(C) to the multimedia network 202. The PSS OK(C) message is processed by the PSSF 132 and forwarded to the I/S-CSCF 116 as a SIP OK(C) message. The CSCF 116 then sends (at 728) the 200 OK(C) message back to the endpoint associated with user C to acknowledge that the Invite message (702) from user C has been accepted by the mobile station 104. At this point, the call session between user A and user B has been placed on hold, and the call session between user A and user C can proceed.

Figure 8:
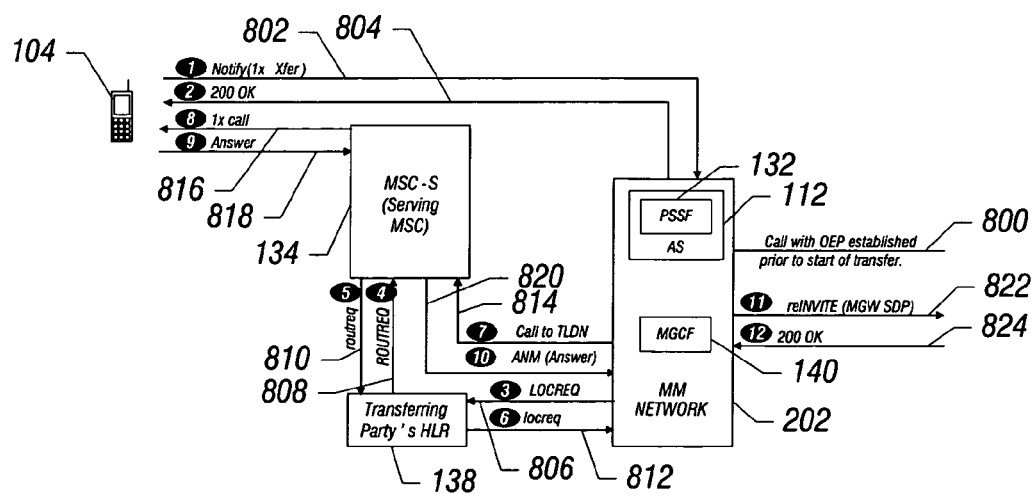

FIG. 8 shows a flow for transferring from a packet-switched access network to the 1xRTT circuit-switched access network. More specifically, FIG. 8 shows transfer from the 1xEV-DO domain to the 1xRTT domain. In other implementations, transfer can be performed between other types of packet-switched access networks and the 1xRTT access network. Upon detecting a trigger to transfer the mobile station from the 1xEV-DO access network to the 1xRTT access network (which can be due to fading communication with the 1xEV-DO access network), the mobile station 104 sends (at 802) a SIP Notify message that contains an indication to transfer the call to the 1xRTT access network. The SIP Notify message is sent to the VCC application server 112.

Although the mobile station 104 can be the element that triggers the inter-domain transfer, another implementation uses a 1xEV-DO network element to trigger the inter-domain transfer based on location of the mobile station and/or other conditions, such as RF signal strength. This provides the service operator with an enhanced level of control over the inter-domain transfer.

The flow in FIG. 8 attempts to minimize or otherwise reduce the break time associated with the inter-domain transfer, where the break time is the amount of time for the mobile station 104 to retune from the 1xEV-DO access network to the 1xRTT access network plus the time to perform the reInvite to the other endpoint.

Note that the SIP Notify message sent at 802 traverses through the packet-switched access network (not through the circuit-switched access network). This path goes through the P-CSCF 114, I/S-CSCF 116, and the VCC application server 112 shown in FIG. 1. In response to the Notify message, the application server 112 sends (at 804) a SIP 200 OK message to the mobile station 104. Also, the application server 112 sends (at 806) a location request (LOCREQ) message to the HLR 138 of the transferring party (in this case, mobile station 104). In response to the LOCREQ message, the HLR 138 sends a ROUTREQ message to the MSC 134, which is an ANSI-41 routing request used to obtain the TLDN of the MSC 134 serving the mobile station 104. The MSC 134 responds (at 810) with a routreq message to the HLR 138, where the routreq message contains the TLDN of the MSC. The HLR 138 then sends (at 812) a locreq message containing the TLDN to the application server 112.

Next, the application server 112 sends an Invite message to the TLDN through the MGCF 140. The MGCF 140, in response to the Invite by the application server 112 to the TLDN, sends (at 814) an IAM message to the TLDN, which is received by the MSC 134. The MSC 134 responds by sending a 1xRTT call (at 816) to the mobile station 104, which answers (at 818). In response to the answer from the mobile station 104, the MSC 134 sends (at 820) an ANM (answer) message back to the MGCF 140. In response to the AMN message, the MGCF 140 returns a 200 OK message to the application server 112.

In response to the 200 OK message, the application server 112 sends a reInvite message (with the SDP of the media gateway 142 associated with the MGCF 140). The SDP of the media gateway 142 is provided to indicate that the bearer path of the call transferred to the 1xRTT access network is to passed through the media gateway 142 (to convert between packet-switched and circuit-switched bearer traffic). The MGCF 140 forwards (at 822) the reInvite message to the other endpoint, which responds (at 824) with a SIP 200 OK message. At this point, the application server 112 can terminate the call session over the 1xEV-DO access network (such as with a SIP BYE message). Also, the application server 112 can send the final SDP information to the mobile station, such as with a PSSF Notify message sent by the PSSF 132 to the MSC 134 and forwarded through the 1xRTT access network to the mobile station.

Figure 9:
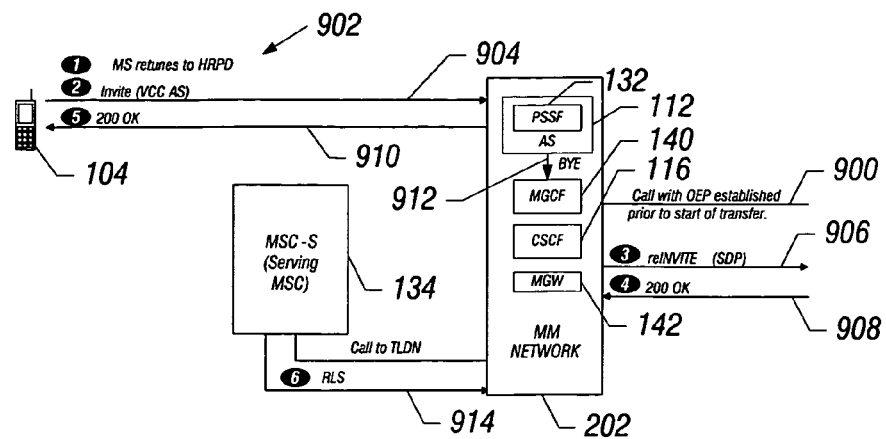

FIG. 9 shows a flow for inter-domain transfer from the 1xRTT network to the 1xEV-DO network. The inter-domain transfer from the 1xRTT to the 1xEV-DO network can be triggered by the 1xRTT network based on location of the mobile station 104 and/or based on other conditions, or the transfer can be triggered by the mobile station based on RF conditions at the mobile station. The mobile station 104 retunes to the 1xEV-DO network (at 902) in response to the trigger. The mobile station 104 then sends (at 904) an Invite message to the multimedia network 202. The I/S-CSCF 116 in the multimedia network 202 forwards the Invite message (904) to the application server 112, which responds by generating a reInvite message containing the new SDP, with this reInvite message sent (at 906) to the other endpoint. The new SDP refers to a new media path through the packet-switched domain rather than the circuit-switched domain. The other endpoint accepts the reInvite message and returns (at 908) a 200 OK message to the multimedia network 202. The I/S-CSCF 116 forwards (at 910) the 200 OK message to the mobile station 104. At this point, the call session has been established between the mobile station 104 and the other endpoint through the packet-switched access network.

The application server 112 also sends (at 912) a SIP BYE message to the MGCF 140 to terminate the bearer path through the media gateway 142. Also, after some period of time (which can be a provisionable amount of time), the MSC 134 sends (at 914) an RLS (release) message to the MGCF 140 to release the circuit-switched bearer path between the mobile station 104 and media gateway 142.

Figure 10:
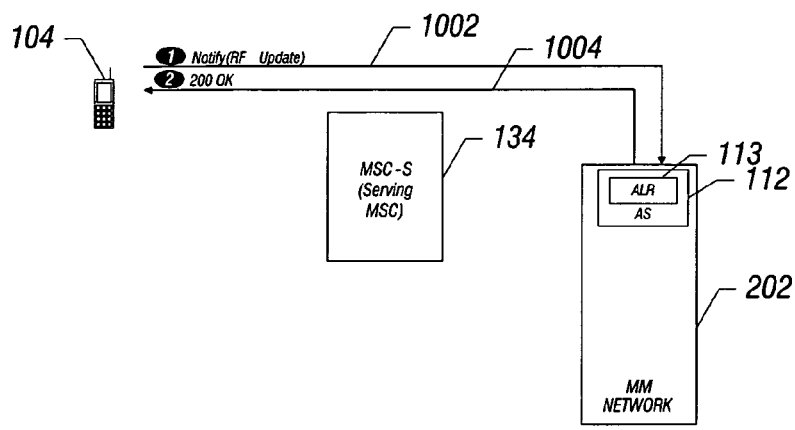

FIG. 10 shows a flow diagram of a flow to update the information in the ALR 113 regarding the RF condition of the mobile station 104 that is attached to the packet-switched access network. The mobile station 104 sends (at 1004) a SIP Notify message containing information relating to an update of the RF condition to the application server 112, which RF update information is used to update information contained in the ALR 113 pertaining to the mobile station 104. The application server responds (at 1004) with a SIP 200 OK message to the mobile station to acknowledge the Notify message.

Figure 11:
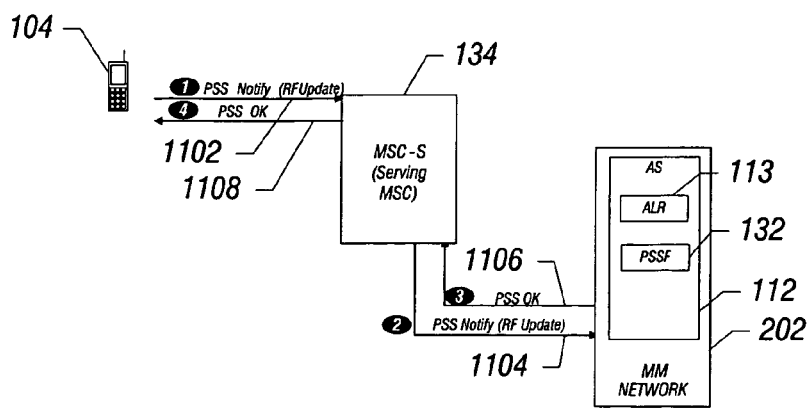

FIG. 11 shows the flow to update the information in the ALR 113 regarding attachment of the mobile station 104 to the circuit-switched access network. This is accomplished by the mobile station 104 sending (at 1102) the PSS Notify message containing the RF update information to the MSC 134. The MSC 134 forwards (at 1104) the PSS Notify messaging containing the RF update information to the PSSF 132 in the multimedia network 202. The PSSF 132 extracts the Notify message, which is processed and updates the information in the ALR 1113 regarding the RF condition of the circuit-switched access network connection of the mobile station 104.

The application server 112 responds with a SIP 200 OK message to the PSSF 132, which then responds (at 1106) with a PSS OK message to the MSC 134. The MSC 134 then sends (at 1108) the PSS OK message to the mobile station 104.

Although various example call flows have been provided above, it is noted that other call flows are also possible.

Note that the various functions discussed above, including the PSSF 132, PSS encoder/decoder 206, CSCFs, application server, MGCF, and so forth, can be implemented with software. Instructions of such software are loaded for execution on a processor (such as a processor in the mobile station 104 or a processor in a node of the multimedia network 102). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of providing a set of services from a multimedia network to a multi-mode mobile station that is able to operate over a packet-switched access network and a circuit-switched access network, the method comprising:
    storing content related to the multi-mode mobile station;
    receiving availability updates for the multi-mode mobile station, wherein the availability updates comprise whether the multi-mode mobile station is reachable on the packet-switched access network of the circuit-switched access network; and
    transmitting content related to the multi-mode mobile station to one or more network nodes, wherein, based on content of an availability location register, a determination of which of the circuit-switched access network and the packet-switched access network to use for delivery of the set of services to the multi-mode mobile station, and wherein availability content related to the multi-mode station on the packet switched network is passed through a home subscriber sever to the availability location register.

2. The method of claim 1, wherein the circuit-switched access network comprises a code-division multiple access (CDMA) circuit-switched access network.

3. The method of claim 1, wherein the storing, the receiving, and the transmitting is performed by the multi-mode mobile station.

4. The method of claim 3, further comprising: the multi-mode mobile station performing:
    communicating an update of a radio frequency (RF) condition of the multi-mode mobile station on the circuit-switched access network.

5. The method of claim 1, wherein the storing, the receiving, and the transmitting is performed by a function in an application server of the multimedia network.

6. The method of claim 1, wherein the set of services comprise one or more of registering the multi-mode mobile station, originating a call by the multi-mode mobile station, terminating a call at the multi-mode mobile station, placing a call with the multi-mode mobile station on hold, and performing call waiting at the multi-mode mobile station.

7. The method of claim 1, wherein the multi-mode mobile station has a first network identifier when the multi-mode mobile station is accessing the multimedia network over the packet-switched access network, and the multi-mode mobile station has a second, different network identifier when the multi-mode station is accessing the multimedia network over the circuit-switched access network.

8. A node comprising:
    a processor; and
    a module executable on the processor to:
        perform a function of an availability location register, comprising:
            store content related to a multi-mode mobile station;
            receive availability updates for the multi-mode mobile station, wherein the availability updates comprise if the multi-mode mobile station is reachable on a pocket-switched access network or a circuit-switched access network; and
            transmit content related to the multi-mode station to one or more other network nodes, wherein, based on content of the availability location register, a determination of which of a circuit-switched access network and a pocket-switched access network to use for delivery of a call service to a multi-mode mobile station, and wherein availability content related to the multi-mode station on the packet switched network is passed through a home subscriber server to the availability location register.

9. The node of claim 8, wherein the node comprises an application server, and wherein the module comprises a function that is part of the application server.

10. The node of claim 8, wherein the node comprises the multi-mode mobile station, and wherein the multi-mode mobile station further comprises interfaces to enable communication with both the packet-switched access network and the circuit-switched access network.

11. The node of claim 10, wherein the circuit-switched access network comprises a circuit-switched code division multiple access (CDMA) access network.

12. The node of claim 8, wherein the call service comprises registration.

13. The node of claim 8, wherein the node comprises the multi-mode mobile station, and wherein the module is further executable to communicate an update of a radio frequency (RF) condition of the multi-mode mobile station on the circuit-switched access network.

14. The node of claim 8, wherein availability content related to the multi-mode station on the circuit switched network is passed through a home location register to the availability location register.

15. The node of claim 8, wherein the content of the availability location register comprises a wireless condition of the multi-mode mobile station in the circuit-switched access network.

16. The node of claim 8, wherein the multi-mode mobile station has a first network identifier when the multi-mode mobile station is accessing the multimedia network over the packet-switched access network, and the multi-mode mobile station has a second, different network identifier when the multi-mode mobile station is accessing the multimedia network over the circuit-switched access network.

17. An article comprising at least one non-transitory storage medium containing instructions to enable a set of services to be provided from a multimedia network to a multi-mode mobile station that is able to operate over a packet-switched access network and a circuit-switched access network, the instructions when executed causing a node in the multimedia network to:
    store content related to a multi-mode mobile station;
    receive availability updates for the multi-mode mobile station, wherein the availability updates comprise if the multi-mode mobile station is reachable on a packet-switched access network or a circuit-switched access network; and transmit content related to the multi-mode mobile station to one or more other network nodes, wherein, based on content of an availability location register, a determination of which of the circuit-switched access network and packet-switched access network to use for delivering the services to the multi-mode mobile station, and wherein availability content related to the multi-mode station on the packet switched network is passed through a home subsciber sever to the availability location register.

18. The article of claim 17, wherein the multi-mode mobile station has a first network identifier when the multi-mode mobile station is accessing the multimedia network over the packet-switched access network, and the multi-mode mobile station has a second, different network identifier when the multi-mode mobile station is accessing the multimedia network over the circuit-switched access network.

19. The article of claim 7, wherein availability content related to the multi-mode station on the circuit switched network is passed through a home location register to the availability location register.

20. The article of claim 7, wherein the circuit-switched access network comprises a code-division multiple access (CDMA) circuit-switched access network.

21. The article of claim 7, wherein the node comprises an application server, and wherein the module comprises a function that is part of the application server.

22. The article of claim 7, wherein the node comprises the multi-mode mobile station, and wherein the multi-mode mobile station further comprises interfaces to enable communication with both the packet-switched access network and the circuit-switched access network.

23. The article of claim 7, wherein the set of services comprise one or more of registering the multi-mode mobile station, originating a call by the multi-mode mobile station, terminating a call at the multi-mode mobile station, placing a call with the multi-mode mobile station on hold, and performing call waiting at the multi-mode mobile station.

24. The article of claim 7, wherein the content of the availability location register comprises a wireless condition of the multi-mode mobile station in the circuit-switched access network.

* * * * *

UNITED STATES PATENT AND TRADEMARK OFFICE
CERTIFICATE OF CORRECTION

PATENT NO. : 9,179,291 B1
APPLICATION NO. : 11/584699
DATED : November 3, 2015
INVENTOR(S) : Mark A. Stegall et al.

It is certified that error appears in the above-identified patent and that said Letters Patent is hereby corrected as shown below:

On the title page, under abstract "24 Claims, 5 Drawing Sheets" should read -- 26 Claims, 5 Drawing Sheets --

In the Claims:

Claim 1, Column 15, Line 41, please delete "packet switched" and substitute -- packet-switched --

Claim 1, Column 15, Line 42, please delete "sever" and substitute -- server --

Claim 8, Column 16, Line 13, please delete "pocket-switched" and substitute -- packet-switched --

Claim 8, Column 16, Line 19, please delete "pocket-switched" and substitute -- packet-switched --

Claim 8, Column 16, Lines 22-23, please delete "packet switched" and substitute
-- packet-switched --

Claim 14, Column 16, Line 44, please delete "circuit switched" and substitute -- circuit-switched --

Claim 17, Column 17, Line 11, please delete "packet switched" and substitute -- packet-switched --

Claim 17, Column 17, Line 12, please delete "subsciber sever" and substitute -- subscriber server --

Claim 19, Column 17, Line 20, please delete "of claim 7" and substitute -- of claim 17 --

Claim 19, Column 17, Line 21, please delete "circuit switched" and substitute -- circuit-switched --

Claim 20, Column 18, Line 1, please delete "of claim 7" and substitute -- of claim 17 --

Claim 21, Column 18, Line 4, please delete "of claim 7" and substitute -- of claim 17 --

Signed and Sealed this
Sixteenth Day of August, 2016

Michelle K. Lee
*Director of the United States Patent and Trademark Office*

CERTIFICATE OF CORRECTION (continued)
U.S. Pat. No. 9,179,291 B1

In the Claims:

Claim 22, Column 18, Line 7, please delete "of claim 7" and substitute -- of claim 17 --

Claim 23, Column 18, Line 12, please delete "of claim 7" and substitute -- of claim 17 --

Claim 24, Column 18, Line 18, please delete "of claim 7" and substitute -- of claim 17 --

Column 18, Line 22, please add the following previously presented claims

25. The method of claim 1, wherein the content of the availability location register comprises a wireless condition of the multi-mode mobile station in the circuit-switched access network.

26. The method of claim 1, wherein availability content related to the multi-mode station on the circuit switched network is passed through a home location register to the availability location register.